United States Patent [19]

McFarland

[11] Patent Number: 5,125,093
[45] Date of Patent: Jun. 23, 1992

[54] INTERRUPT CONTROL FOR MULTIPROCESSOR COMPUTER SYSTEM

[75] Inventor: Harold L. McFarland, San Jose, Calif.

[73] Assignee: Nexgen Microsystems, San Jose, Calif.

[21] Appl. No.: 567,399

[22] Filed: Aug. 14, 1990

[51] Int. Cl.⁵ .............................................. G06F 13/24
[52] U.S. Cl. ................................ 395/725; 364/230.2; 364/941; 364/DIG. 1; 364/DIG. 2
[58] Field of Search ............... 364/200, 230.2, 230.4, 364/230.6, 900, 941, 942.4

[56] References Cited

U.S. PATENT DOCUMENTS

| | | | |
|---|---|---|---|
| 4,149,243 | 4/1979 | Wallis | 364/200 |
| 4,495,569 | 1/1985 | Kagawa | 364/200 |
| 4,598,356 | 7/1986 | Dean et al. | 364/200 |
| 4,604,500 | 8/1986 | Brown et al. | 379/269 |
| 4,722,048 | 1/1988 | Hirsch et al. | 364/200 |
| 4,935,866 | 6/1990 | Sauvajol et al. | 364/200 |

Primary Examiner—Michael R. Fleming
Assistant Examiner—Glenn A. Auve
Attorney, Agent, or Firm—Townsend and Townsend

[57] ABSTRACT

A technique that efficiently allocates the servicing of interrupts among a plurality of CPUs in a multiprocessor computer system requires no change in software that was written for a system with one CPU and one PIC. Symmetric and asymmetric configurations contemplate a primary CPU (15a) and one or more secondary CPU's (15b-d) responding to and servicing multiple sets of interrupts. Both configurations include interrupt supervisory logic to support such operation. The symmetric configuration provides a PIC (20a-d) for each CPU in the system. All the PICs are located at the same I/O address, and separate provision is made to specify which PIC is to respond to an interrupt acknowledge cycle initiated by a particular CPU. The asymmetric configuration of the present invention provides PIC (20a) for the primary CPU (15a) only. That PIC's interrupt line is communicated only to the primary CPU. Another mechanism, such as an ATTN facility (95), is provided to drive the secondary CPU's interrupt inputs. Since the secondary CPUs lack PICs there is provided logic (48) that responds to an interrupt acknowledge operation from any of the secondary CPUs by driving a fixed, interrupt vector onto the data bus.

16 Claims, 7 Drawing Sheets

INTERRUPT CONTROL FOR MULTIPROCESSOR COMPUTER SYSTEM

BACKGROUND OF THE INVENTION

The present invention relates generally to interrupts in a computer system, and more specifically to a programmable interrupt controller (PIC) configuration for use in a multiprocessing environment.

A programmable interrupt controller (PIC) is a device for handling multi-level priority interrupts in a computer system. The PIC receives requests from peripheral devices requiring service, prioritizes the requests, and issues an interrupt to the CPU. For each type of interrupt there is typically an interrupt service routine that the CPU executes. When the CPU acknowledges the interrupt, the PIC provides a pointer (vector) to an address in a table so that the CPU can begin executing the appropriate service routine.

The Chips and Technologies 82C226 System Peripheral Chip provides a number of logic support functions and includes a PIC. The PIC includes sixteen incoming interrupt request lines to which are connected external devices capable of generating interrupts. Internal registers can be configured to mask out selected incoming interrupt requests. An interrupt request on one of these lines causes the PIC to assert a signal on its interrupt line to the CPU. Thereafter, the CPU initiates an interrupt acknowledge cycle on the system data bus, in response to which the PIC provides a vector for the highest priority interrupting device. The PICs can be cascaded to provide additional levels of interrupt.

The existing software base written for 8086, 8088, 80286 and 80386 microprocessors assumes that there is one CPU and one PIC (possibly cascaded). This assumption places a constraint on the design of prospective multiprocessor systems since commercial considerations dictate that existing software run on such systems.

One approach to extending to a multiprocessor environment while maintaining software compatibility is to use a master/slave configuration. In such a case, the PIC would send all interrupts to one of the CPUs, designated the master, and the system would include a mechanism, such as a set of radial attention lines and a set of message buffers, for the CPUs to communicate with each other. The master CPU, in response to an interrupt, would perform the initial vectoring, but the interrupt service routine could specify that some other CPU, referred to as a slave, should service the interrupt. The master CPU would then set the appropriate message buffer entries, and assert a signal on the slave CPU's attention line. The slave CPU would then look in the message buffer to find the starting address for servicing the interrupt.

Such a system presumably works, but suffers from the problem that the master CPU ends up spending a lot of time directing interrupts to slave CPU's. This problem can be acute in a heavy use environment of the type that dictates the use of a multiprocessor configuration in the first place. Additionally, the transfer of control from one processor to the other requires some amount of time, which lengthens the average response time for interrupts.

SUMMARY OF THE INVENTION

The present invention provides a technique that efficiently allocates the servicing of interrupts among a plurality of CPUs in a multiprocessor computer system. The invention requires no change in software that was written for a system with one CPU and one PIC.

The present invention can be implemented in a symmetric or asymmetric configuration. Both configurations contemplate a primary CPU and one or more secondary CPU's responding to and servicing multiple sets of interrupts. Both configurations include interrupt supervisory logic to support such operation.

The symmetric configuration provides a PIC for each CPU in the system, and each PIC's interrupt line is communicated only to that PIC's corresponding CPU. In order to maintain compatibility with older device drivers and operating systems that directly manipulate a CPU's PIC, all the PICs are located at the same I/O address, and separate provision is made to specify which PIC is to respond to an interrupt acknowledge cycle initiated by a particular CPU. In a specific embodiment, the bus protocol defines a Master ID field which allows the CPU driving the bus to specify its slot position. The interrupt supervisory logic includes screening logic responsive to the Master ID field for allowing only the appropriate PIC to put its vector on the data bus.

The computer system preferably includes an attention (ATTN) facility wherein each CPU has an associated ATTN bit, which can be set or reset by any CPU in the system. The ATTN bits are used to generate ATTN interrupts which are communicated to the respective PICs. In a specific embodiment, the system allows an ATTN interrupt for a given CPU to be directed to a selected one of two predetermined inputs on that CPU's PIC.

Depending on the specific implementation, some interrupts may be responded to by more than one PIC. In such a case, more than one CPU receives the interrupt, and separate mechanisms are provided (typically by the operating system software) to allow an interrupted CPU to determine whether or not it is to service the interrupt. Other interrupts may be responded to by only one PIC, in which case only one CPU receives the interrupt, and proceeds to service it.

The symmetric configuration retains the ability to operate in the master/slave mode. More particularly, the PIC for the CPU that is to act as the master has its internal register set to enable all incoming interrupts while the PICs for the CPUs that are to be slaves have their registers set to disable all interrupts.

The asymmetric configuration of the present invention provides a PIC for the primary CPU only. That PIC's interrupt line is communicated only to the primary CPU. Another mechanism, such as an ATTN facility, is provided to drive the secondary CPU's interrupt inputs. For example, in the case of an ATTN facility, the ATTN bit for each of the secondary CPUs may be communicated to the corresponding CPU rather than to the secondary PICs as in the symmetric configuration. Since the secondary CPUs lack PICs, there is provided logic that responds to an interrupt acknowledge operation from any of the secondary CPUs by driving a fixed, interrupt vector onto the data bus. As in the symmetric case, the interrupt supervisory logic determines which CPU is initiating the interrupt acknowledge cycle on the basis of the Master ID field.

A further understanding of the nature and advantages of the invention may be realized by reference to the remaining portions of the specification and the drawings.

BRIEF DESCRIPTION OF THE APPENDICES

Figure 1:
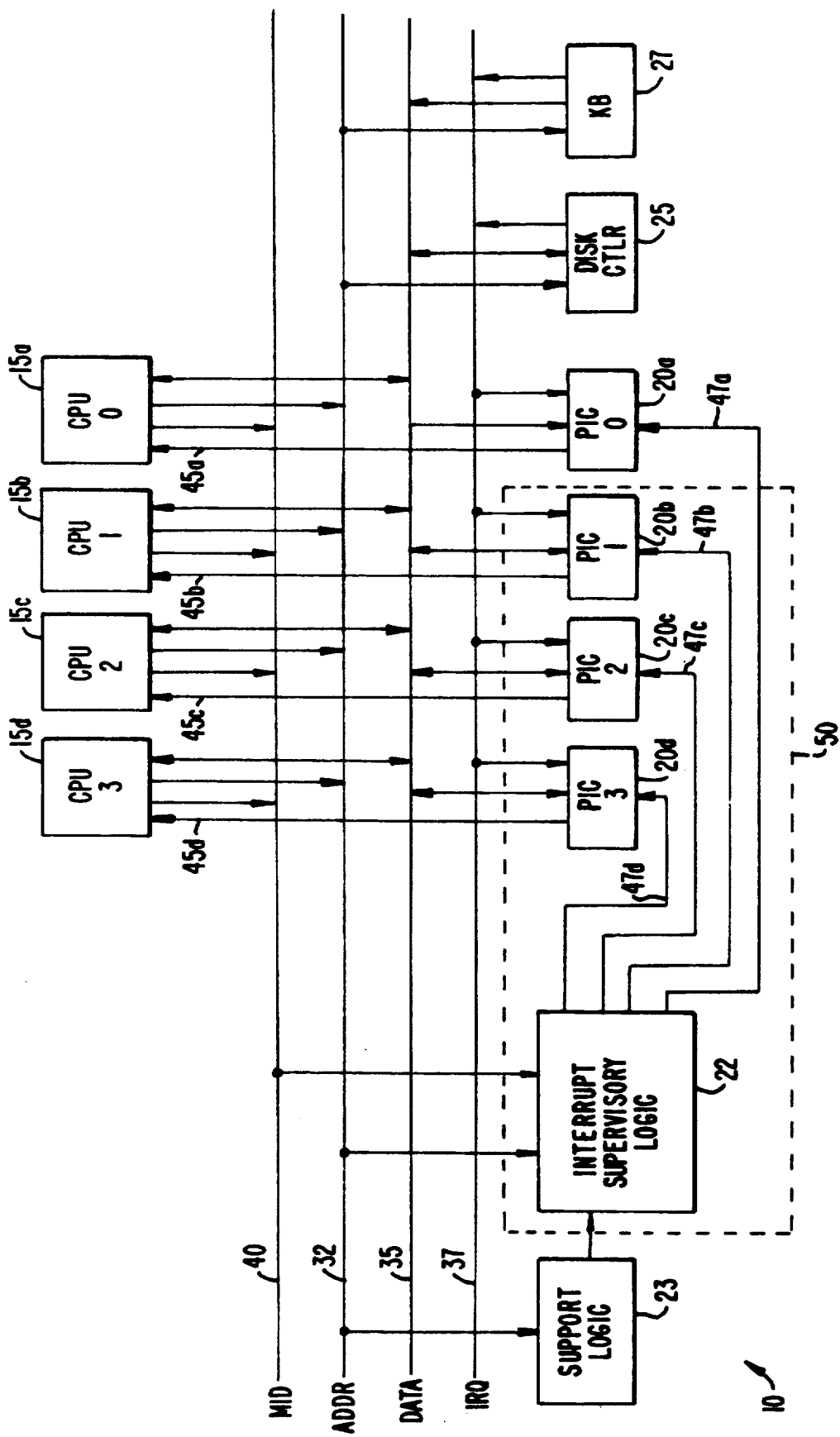
FIG. 1 is a simplified block diagram of a multiprocessor computer system incorporating the symmetric interrupt controller configuration of the present invention.

Appendix 1 describes the system bus (NexBus) signals;

Appendix 2 sets forth the AD-bus format during the address/status phase;

Appendix 3 sets forth the interrupt assignments;

Appendix 4 sets forth the PAL equations for the symmetric configuration interrupt control logic; and Appendix 5 sets forth the PAL equations for the asymmetric configuration interrupt control logic.

DESCRIPTION OF SPECIFIC EMBODIMENTS

Introduction

The following description of the techniques for handling interrupts in a multiprocessor environment deals with two configurations, referred to as the symmetric configuration and the asymmetric configuration. In the symmetric configuration, the primary CPU and the secondary CPUs each have a programmable interrupt controller (PIC). In the asymmetric configuration, only the primary CPU has a PIC, and other mechanisms are provided to generate interrupts and to provide an interrupt vector in response to an interrupt acknowledge operation. In the description of the asymmetric configuration, the same reference numerals will be used for elements that are the same as those in the symmetric configuration, while primed reference numerals will be used for those elements that generally correspond.

Symmetric Configuration Overview

FIG. 1 is a simplified block diagram of a computer system 10 incorporating the symmetric multiprocessor configuration of the present invention. In this configuration, there are a plurality of processing units (CPUs) 15, and a corresponding plurality of programmable interrupt controllers (PICs) 20. For illustration purposes, FIG. 1 shows four CPUs 15a-d and their associated PICs 20a-d.

CPU 15a is referred to as the primary CPU and CPUs 15b-d are referred to as the secondary CPUs. Similar nomenclature applies to PIC 20a and PICs 20b-d. Signals and other references pertaining to a particular CPU or PIC will sometimes have suffixes 0-3 corresponding to the suffixes a-d on the reference numerals.

The system also includes interrupt supervisory logic 22, general support logic 23, and a number of peripherals including a disk controller 25 and a keyboard controller 27. The CPUs, PICs, and peripherals communicate with each other via a number of buses and control lines, including an address bus 32, a data bus 35, a set of interrupt request (IRQ) lines 37, and a set of Master ID (MID) lines 40. PICs 20a-d communicate interrupts to their respective CPUs on interrupt lines 45a-d.

Each of the CPUs is coupled to the address and data buses in the normal fashion. Each CPU, when it is controlling the address and data buses, drives a code unique to itself on MID bus 40. In a specific embodiment the code corresponds to the CPU's slot ID. Each PIC is coupled to data bus 35 and at least some of IRQ lines 37. Each of the peripherals is coupled to the address and data buses in the normal fashion, and to a selected IRQ line.

Interrupt supervisory logic 22 receives signals from the MID lines, address information either directly from the address bus or as decoded by support logic 23, and other control signals and configuration information from the support logic. Logic 22 communicates with PICs 20a-d via respective radial sets 47a-d of PIC control lines. As will be seen below, it is convenient to refer to interrupt supervisory logic 22 and secondary PICs 15b-d collectively as the multiprocessor interrupt control logic, referred to as MPIC 50, since it is the MPIC that provides the multiprocessor interrupt support.

Upon receiving an interrupt from its associated PIC, the CPU performs a first interrupt acknowledge operation to latch the state of its associated PIC and a second operation to transfer the interrupt vector from the PIC to the CPU via the data bus. The CPU then proceeds to service the interrupt request by executing an interrupt handler pointed to by the interrupt vector.

Depending on the specific implementation, some interrupts may be responded to by more than one PIC. In such a case, more than one CPU receives the interrupt, and separate mechanisms are provided (typically by the operating system software) to allow an interrupted CPU to determine whether or not it is to service the interrupt. Other interrupts may be responded to by only one PIC, in which case only one CPU receives the interrupt, and proceeds to service it.

Each CPU must be able to address its associated PIC uniquely. However, software compatibility considerations require that the PICs be located at the same I/O address. To overcome this problem, screening logic in interrupt supervisory logic 22 decodes the MID bus and drives the appropriate set of PIC radial control lines. Since the MID field uniquely identifies the CPU driving the bus, the correct PIC is selected.

Symmetric Configuration Details

Figure 2:
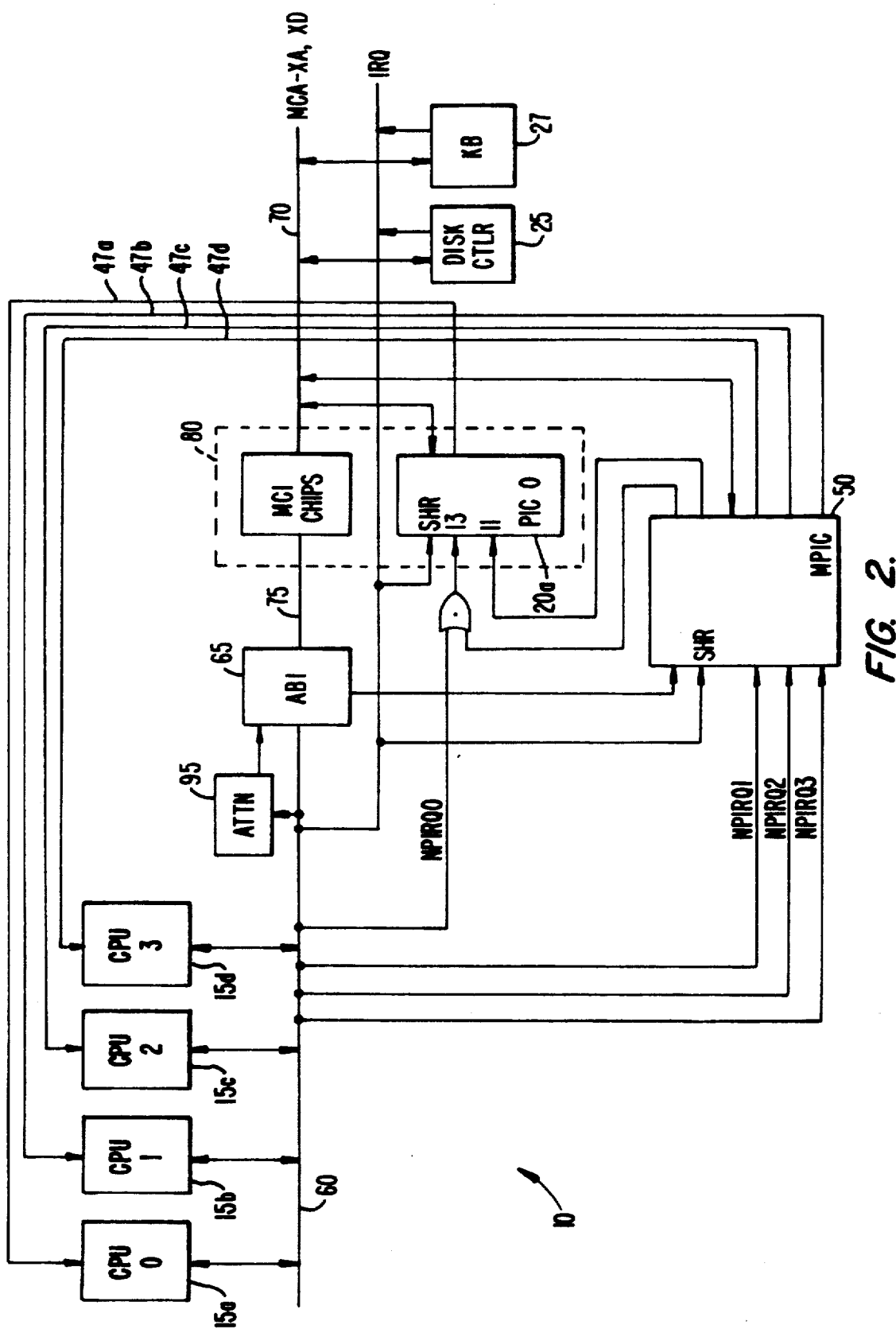
FIG. 2 is a block diagram of a specific implementation of the symmetric configuration.

FIG. 2 is a block diagram of a particular implementation of computer system 10 incorporating the symmetric configuration. Elements corresponding to those in FIG. 1 will be shown with corresponding reference numerals. In the particular implementation, each of CPUs 15a-d includes an Intel 80386 microprocessor or the like and an associated numeric co-processor, and is coupled through a suitable bus interface to a proprietary system bus 60, sometimes referred to as the NexBus. Devices coupled via such bus interfaces to the NexBus are referred to as NexBus adapters.

In accordance with known practice, the bus lines are implemented as signal traces on a backplane circuit board referred to as a motherboard, and the adapters and at least some control logic are built on circuit boards, which are plugged into connectors on the motherboard. The connectors are referred to as slots and are numbered from 0 to 15. Each slot supports 4 sub-slots, which may correspond to separate functional units contained on a single adapter board (as determined by the type of primary functional unit in sub-slot 0). Appendix 1 provides a description of the NexBus signals. The signal names in the appendices and schematics have a minus sign prefix or an asterisk suffix foractive low signals.

NexBus 60 includes a 64-bit multiplexed address and data bus (AD-Bus). Bit positions on the AD-bus are numbered from 63 (most significant) to 0 (least significant). A NexBus master (such as one of the CPUs) communicates address and status in one bus phase, and the master or the addressed slave communicates data in a data phase, not necessarily in the same bus cycle. Appendix 2 sets forth the information that is communicated during the address/status phase. The MID lines are AD<45:40>, allowing the specification of 16 slots, each with 4 sub-slots. A 3-bit OPTYPE field AD<48:46> specifies the type of bus operation.

The adapters include: CPU 15a, referred to as the primary CPU, in slot 15; CPUs 15b–d, referred to as secondary CPUs, in slots 14, 13, and 12; and an alternate bus interface (ABI) 65. The ABI is defined to occupy slot 0 although it is physically part of the motherboard logic. Other adapters (not shown) would include one or more memory subsystems shared between the processors, and optional high-speed I/O devices.

Adapters plugged into the NexBus slots are initialized through memory mapped registers that are located in the upper ranges of the 4GB memory space. Accesses to these locations enable the system to determine what type of device is plugged into the slot, and to configure each adapter. The address range for system initialization is from (4GB-16MB) or FF000000 to (4GB-8MB-1) or FF7FFFFF. This 8MB area is divided into 16 regions, each corresponding to a slot. Each region is subdivided into four sub-slot regions, each of which has a memory space of 32 4KB pages. The processors initialize themselves by reading their own SLOTID bits to determine whether they are primary or secondary CPUs, and branch accordingly to the proper POST (Power On Self Test) code.

PICs 20a–d and the peripherals are connected to an alternate bus (AB) 70, which in this case is the local I/O bus of the PS/2's Microchannel Architecture (MCA). ABI 65 couples the NexBus to a bus 75, referred to as the 386 bus, that has the same protocol as the local buses on an Intel 80386 microprocessor. The interface between the 386 bus and the MCA-bus is provided by a Microchannel Interface (MCI) 80, which provides the logic support for a 386-based system using the MCA.

MCI 80 is part of the motherboard logic and is implemented in a commercially available chip set, namely a Chips and Technologies CHIPS/280 PS/2 Model 70/80 compatible chip set. The chip set includes an 82C226 System Peripheral Chip, which provides a PIC as well as other peripheral functions. This is shown as primary PIC 20a, and in a typical prior art system would be the only PIC. Secondary PICs 20b–d and interrupt supervisory logic 22 are part of MPIC 50, which supports the multiprocessor interrupts. The MPIC is coupled to AB 70 and is further responsive to certain NexBus and MCA-bus signals, signals derived from them, and other signals from the ABI. MPIC 50 may be implemented on the motherboard or on a small circuit board that plugs into a connector on the motherboard.

Additional support logic 95 on the motherboard, associated with the ABI, provides an attention (ATTN) facility wherein any master can gain the attention of any of the CPUs. As noted above, each of the CPU sub-slot regions contains 32 pages. Any read operation to any address in page 3 sets an ATTN flag in the motherboard logic dedicated to support that processor slot, and any write to any address in page 3 clears the ATTN flag. At power on, the primary CPU sets up the page map table to specify which CPU(s) have read and write access to page 3 of the various sub-slot regions. In one typical configuration, read access will be given to all CPUs but write access only to the CPU corresponding to that sub-slot. Thus, in this configuration any CPU can set any other CPU's ATTN flag, but a CPU can only clear its own ATTN flag.

Appendix 3 is a list of the interrupt assignments. −IRQ<3:7,9:12,14:15> are shared interrupts for devices such as disk controllers and serial ports. They are available as lines on the NexBus and the MCA-bus and are level sensitive, meaning that they may be easily shared by use of open collector drivers.

In addition to these normal device interrupts, system interrupt requests include a periodic timer (−IRQ<0>), a real time clock (−IRQ<8>), and a numeric processor (NP) error indicator (−NPIRQ). The sources of these interrupts are duplicated for each CPU, and each CPU can access and respond to only its own timer, clock, and NP. −IRQ<1> is available only to primary CPU 15a.

The ATTN interrupt can be implemented as either a −IRQ<11> or −IRQ<13> interrupt, as determined by the state of the ATTN IRQ Select (AIS) bit of the extended control register in the motherboard logic. If AIS=0 (the default), then setting the ATTN bit for a particular CPU causes a request on the −IRQ<11> input of that CPU's PIC. If an adapter asserts the −IRQ<11> line, the −IRQ<11> inputs of all the PICs are asserted.

In order to avoid conflicts with adapters or software that can only function on −IRQ<11>, the AIS bit can be set to 1. If AIS=1, the ATTN interrupts assert −IRQ<13> instead of −IRQ<11>. This is less desirable since −IRQ<13> is dedicated to the NP interrupt and the −IRQ<13> service routine must first check for an NP interrupt before transferring to the ATTN interrupt service routine. However, −IRQ<13> has the advantage of a low level of usage and so it makes a good fallback position if −IRQ<11> cannot be used.

Figure 3:
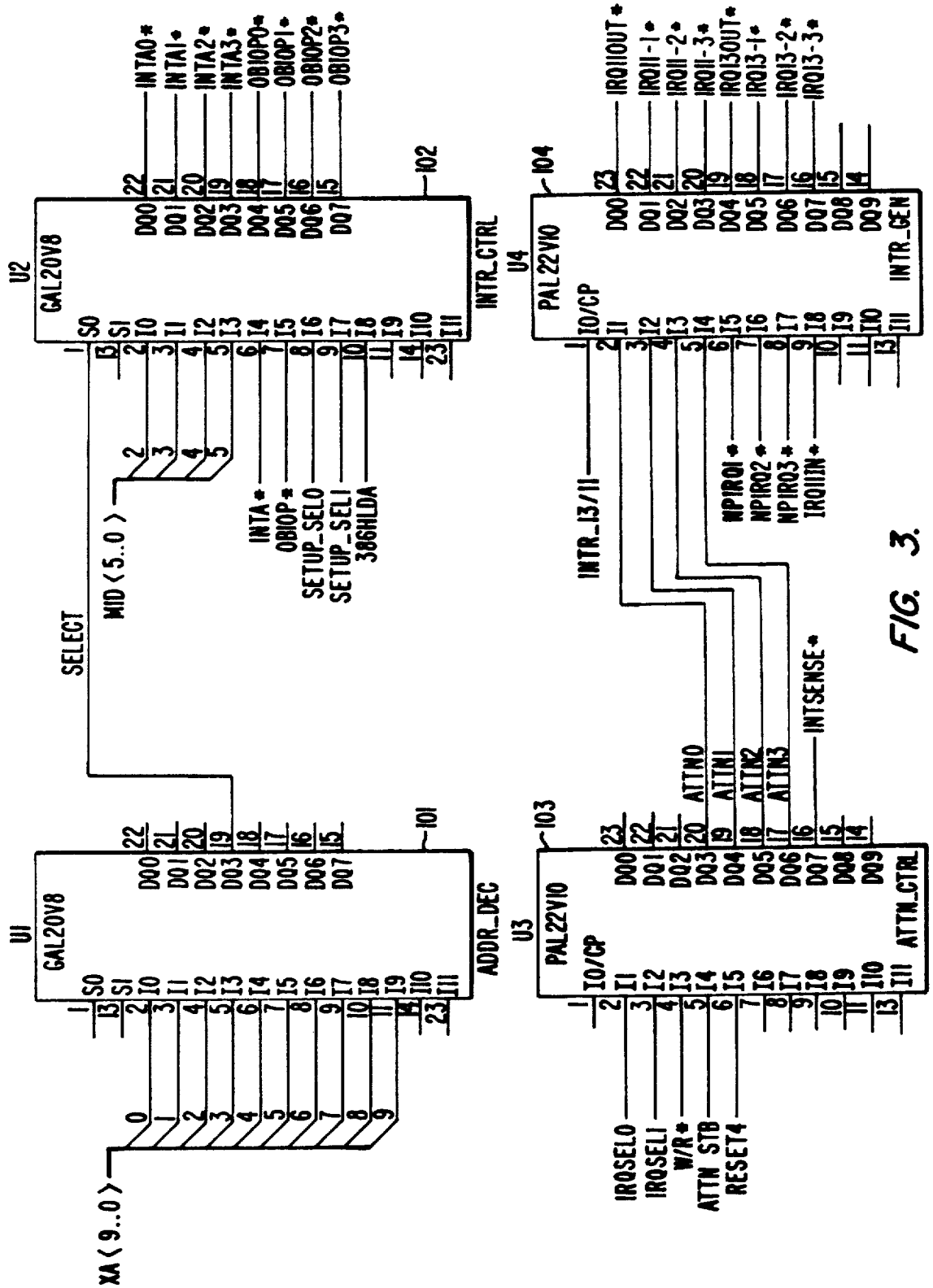
FIG. 3 is a logic schematic of the symmetric configuration's PIC control logic.

FIG. 3 is a logic schematic of interrupt supervisory logic 22 within MPIC 50. Logic 22 preferably comprises four programmable array logic (PAL) devices 101, 102, 103, and 104, programmed for operation as described below. The PAL equations are set forth in Appendix 4.

PAL 101 is coupled to the XA-bus (local I/O address bus on the MCA-bus) and provides a Select bit for address redirection. The purpose of address redirection is to allow all the CPUs to access the non-PIC peripherals (real time clock, printer port, etc.) in a single System Peripheral Chip, namely the one on the motherboard. In the current embodiment the address redirection is not implemented, and the Select bit is set to 1.

PAL 102 receives latched versions of the NexBus MID lines as well as OBIOP and INTA signals from the MCI. OBIOP is derived from the I/O address and specifies an access to the System Peripheral chips. INTA is generated when OPTYPE=000 during the NexBus address/status phase and specifies an interrupt acknowledge. Based on the MID field, PAL 102 provides radial OBIOP and INTA signals to a selected one of the four PICs. An option is provided for CPU 15a to assert the radial OBIOP for any of PICs 20b–d depending on the value of a 2-bit register SETUP_SEL on the NexBus side of the motherboard. A value of 0 specifies normal operation where each CPU (including CPU 15a) accesses its own PIC only. PIC 20a is also selected in the event that a master on the MCA-bus asserts HLDA386.

PAL 103 generates ATTN interrupts for the CPUs. A 2-bit IRQSEL signal specifies the particular CPU to be interrupted. An ATTN strobe signal generated by the ABI validates the setting or clearing of the ATTN interrupts, and a write signal (W/−R) derived from OPTYPE on the NexBus determines whether the ATTN is to be set or cleared. −INTSENSE is a pin connected to ground on MPIC 50 and pulled up on MCI 80. This allows the system to determine whether an MPIC board is present. When the MPIC is absent, all PIC accesses are routed to the primary PIC.

PAL 104 drives radial −IRQ11 and −IRQ13 signals based on the ATTN interrupt signals from PAL 103, the −NPIRQ signals from the secondary CPUs, and a collection of all −IRQ<11> signals from the NexBus and the MCA-bus. Whether the ATTN interrupts appear on the radial −IRQ11 or radial −IRQ13 lines depends on the input of a signal INTR_13/11 which corresponds to AIS. The −IRQ13OUT signal is driven to 0 only if the ATTN interrupt for CPU 15a is asserted and AIS=1. Otherwise it is disabled. The −NPIRQ signals from the secondary CPUs are also communicated on the respective radial −IRQ13 lines while −NPIRQ0 is communicated directly to the −IRQ<13> input on PIC 20a. This is shown as a wire OR in FIG. 2 since open collector devices are used.

Figure 4:
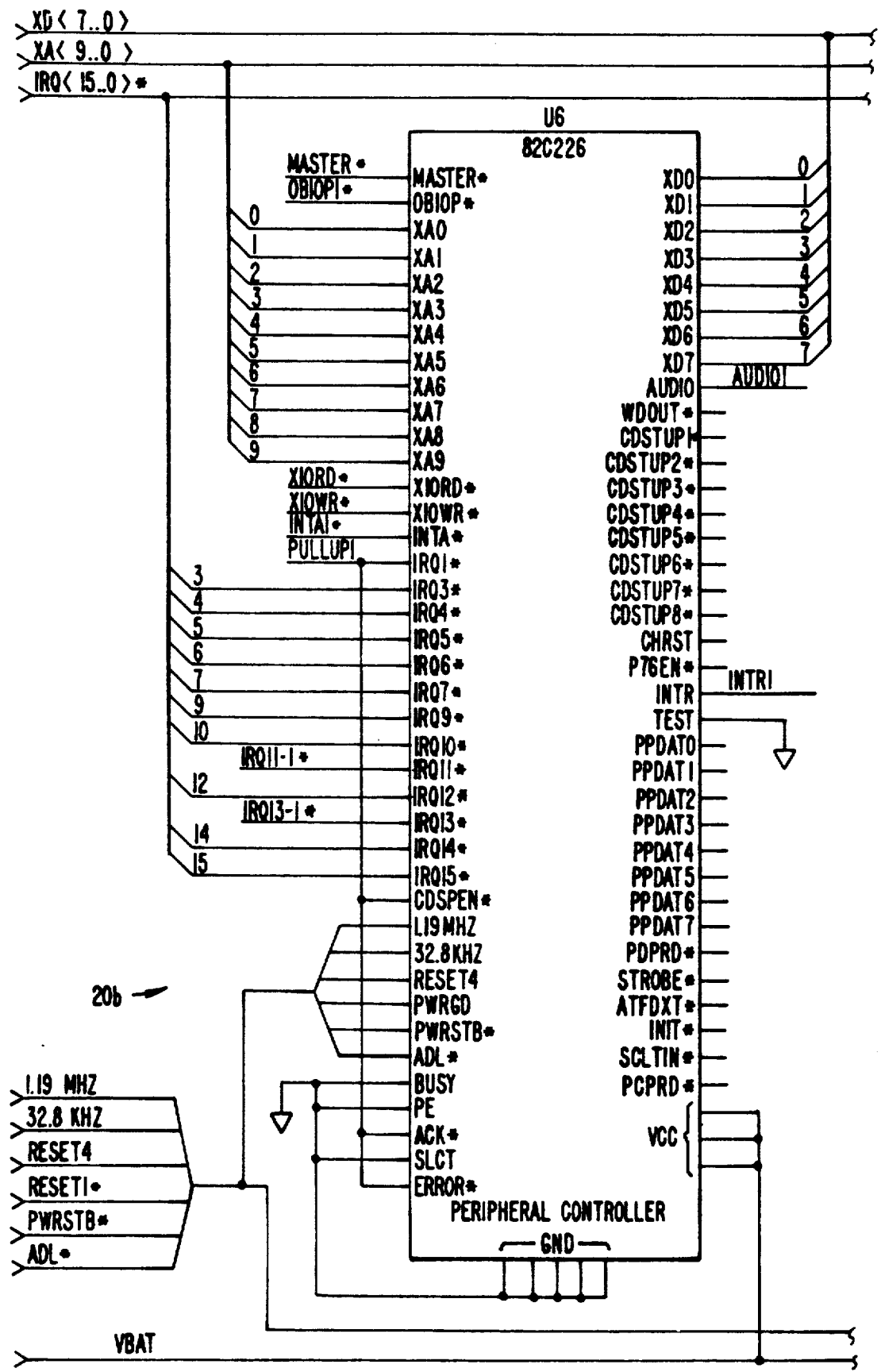
FIG. 4 is a logic schematic of one of the symmetric configuration's secondary PICs.

FIG. 4 is a logic schematic of one of the secondary PICs, say PIC 20b. PICs 20c and 20d are connected the same way except that they receive their own respective signals corresponding to −OBIOP1, −INTA1, −IRQ11−1, and −IRQ13−1; provide their own respective signals corresponding to AUDIO1 and INTR1; and have their own pullups.

Asymmetric Configuration Overview

Figure 5:
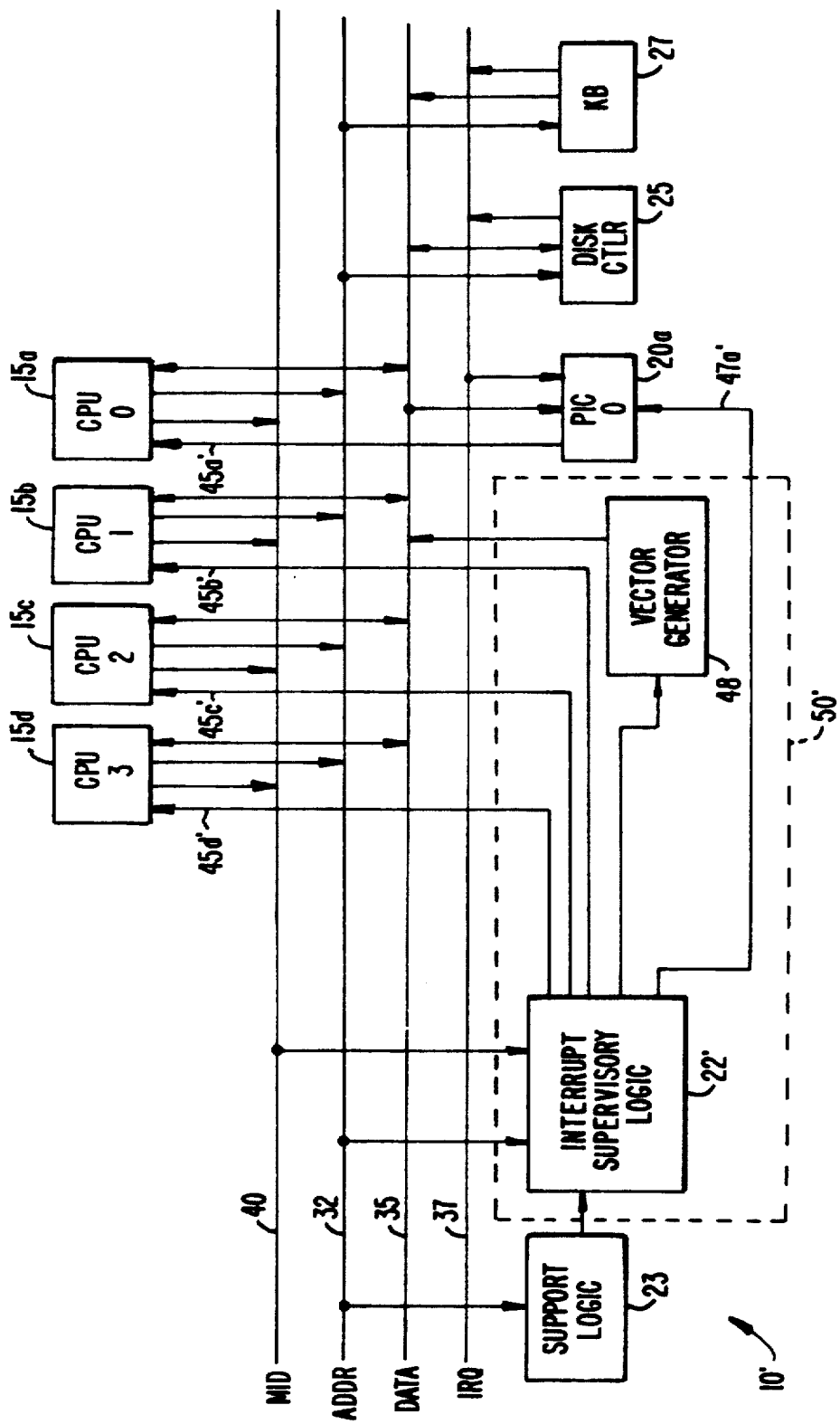
FIG. 5 is a simplified block diagram of a multiprocessor computer system incorporating the asymmetric interrupt controller configuration of the present invention.

FIG. 5 is a simplified block diagram of a computer system 10' incorporating the asymmetric multiprocessor configuration of the present invention. The system is shown with four CPUs 15a–d, but unlike the symmetric configuration discussed above, only primary CPU 15a has an associated PIC 20a. The system also includes interrupt supervisory logic 22', general support logic 23, and a number of peripherals.

The CPUs, PIC, and peripherals communicate with each other via an address bus 32, a data bus 35, a set of IRQ lines 37, and a set of MID lines 40. PIC 20a communicates interrupts to CPU 15a on an interrupt line 45a, while interrupt supervisory logic 22' communicates interrupts to CPUs 15b–d on a set of interrupt lines 45b'–45d'. The various elements are shown to be connected to the buses and lines as in the symmetric configuration.

Interrupt supervisory logic 22' receives signals from the MID lines, address information either directly from the address bus or is decoded by support logic 23, and other control signals and configuration information from the support logic. Logic 22' communicates with PIC 20a via a set 47a' of PIC control lines. Logic 22' is coupled to a vector generator 48. Logic 22' and vector generator 48 together define MPIC 50'.

Possible sources of interrupts for primary CPU 15a are communicated to PIC 20a while potential sources for interrupts for the secondary CPUs are communicated to the interrupts supervisory logic 22', which, as noted above, communicates interrupt to the secondary CPUs. Upon receiving an interrupt, the primary CPU performs interrupt acknowledge operations and the PIC transfers the interrupt vector to the CPU via the data bus. This is the same as in the case of the symmetric configuration. However, in the asymmetric configuration, the secondary CPUs have no PICs. In this case, when the interrupt supervisory logic determines (on the basis of the MID lines) that an interrupt acknowledge operation is being initiated by one of the secondary CPUs, logic 22' causes vector generator 48 to write a fixed interrupt vector onto the data bus.

Asymmetric Configuration Details

Figure 6:
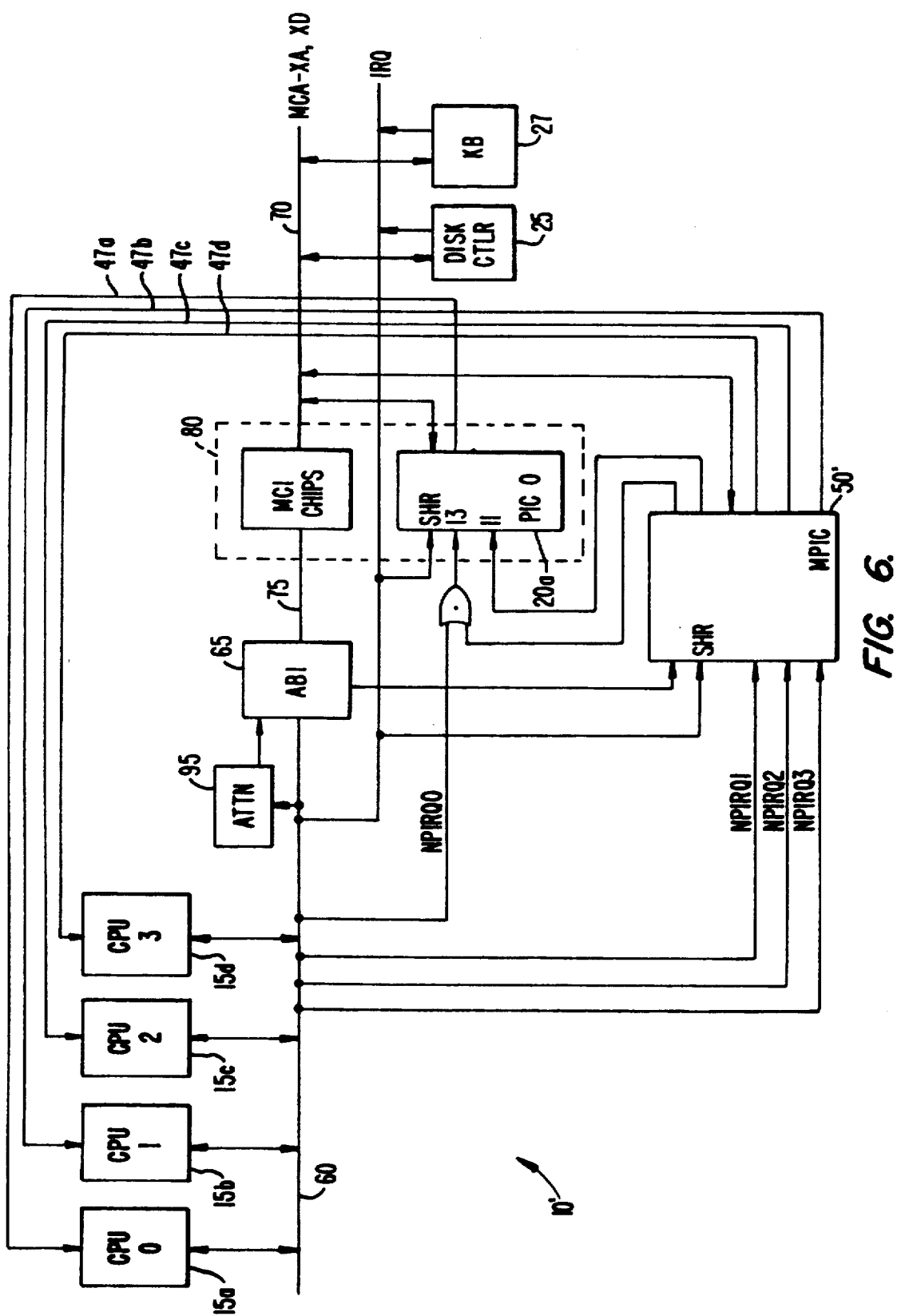
FIG. 6 is a block diagram of a specific implementation of the asymmetric configuration.

FIG. 6 is a block diagram of a particular implementation of computer system 10' incorporating the asymmetric configuration. The diagram at this level is very similar to the block diagram of FIG. 2, except that MPIC 50' is not coupled to all the shared interrupt lines, since it does not contain PICs. MPIC 50' still receives the NPIRQ and ATTN interrupts.

Figure 7:
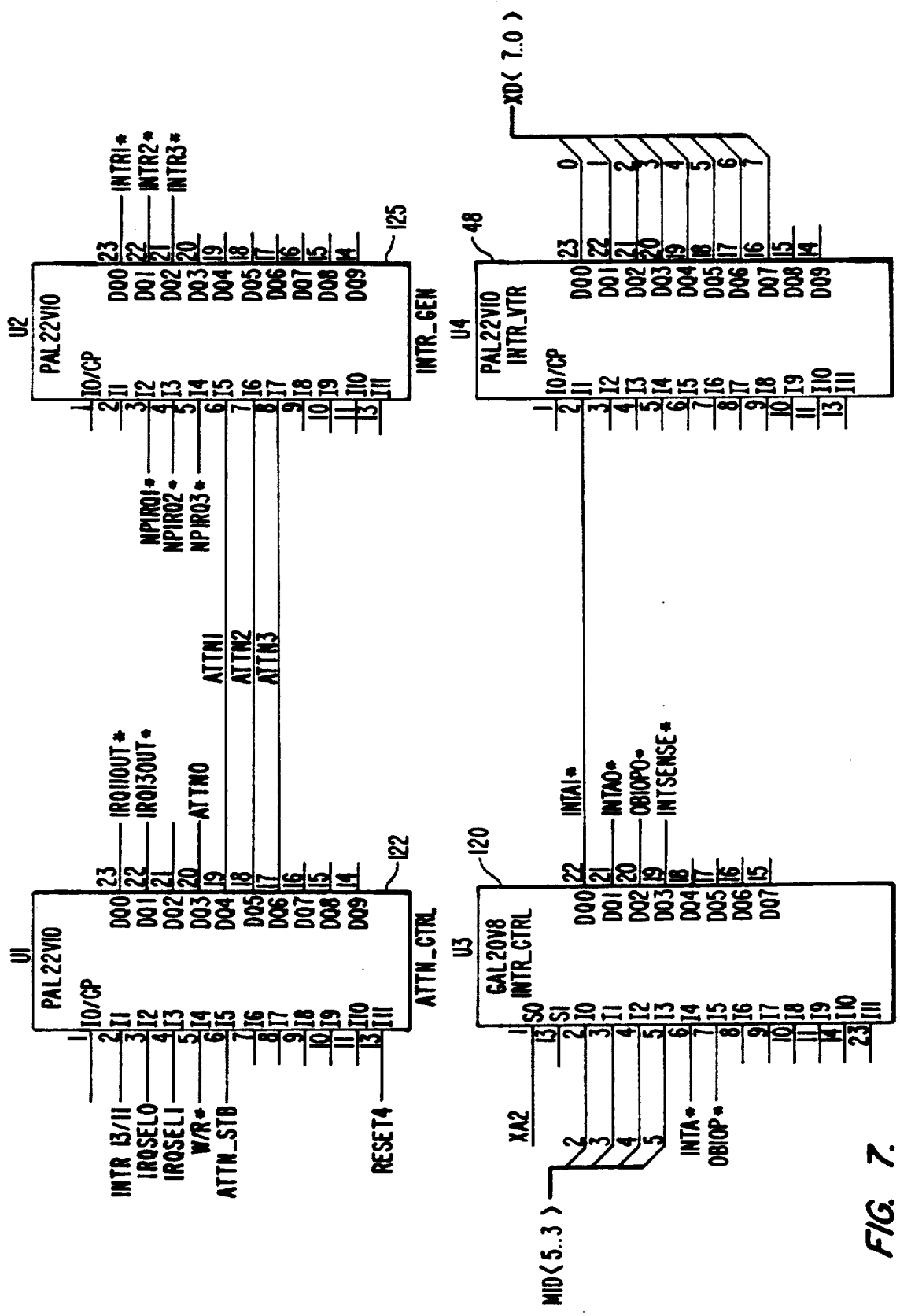
FIG. 7 is a logic schematic of the asymmetric configuration's interrupt control logic.

FIG. 7 is a logic schematic of interrupt supervisory logic 22' and vector generator 48 within MPIC 50'. Logic 22' preferably comprises four PAL devices 120, 122, and 125, programmed for operation as described below. Vector generator 48 is also preferably implemented as a PAL device. The PAL equations are set forth in Appendix 5.

PAL 120 corresponds generally to PAL 102 in the symmetric MPIC. It receives latched versions of the MID lines and the OBIOP and INTA signals, and based on this provides INTA0 and OBIOP0 signals to PIC 20a when the MID field signifies the primary CPU and an INTA signal to vector generator 48 when the MID field indicates a secondary CPU.

PALs 122 and 125 together perform operations corresponding generally to PALs 103 and 104 together in the symmetric MPIC. PAL 122 derives four ATTN signals. One, ATTN0, is used to enable IRQ11 and IRQ13 lines to PIC 20a, while the other three, ATTN1, ATTN2, and ATTN3, are input to PAL 125. PAL 125 receives the NPIRQ signals from the secondary processors, and combines them with the secondary ATTN signals to provide interrupt signals −INTR1, −INTR2, and −INTR3, which are communicated to the interrupt inputs of secondary CPUs.

Conclusion

In conclusion it can be seen that the present invention provides a flexible and transparent interrupt support for multiprocessor computer systems.

While the above is a complete description of the preferred embodiments of the invention, various alternatives, modifications, and equivalents may be used. For example, vector generator 48 in the asymmetric configuration could be a programmable register rather than a hardwired one. Indeed, separate vector registers could be provided for the secondary CPUs.

Therefore, the above description should not be taken as limiting the scope of the invention which is defined by the appended claims.

APPENDIX 1

NexBus Signal Description

AD<63:0>: Address, Status and Data bits 63 through 0: This bus conveys either address and status or data. During an address transfer phase, indicated by the assertion of GALE, AD<63:0> contains address and status information defining a bus operation. During the data transfer phase, signaled by the assertion of GXACK, this bus contains up to 64 bits of data.

−ALE[n], GALE: Address Latch Enable: The −ALE[n] signals are issued by the master. The GALE signal is monitored by all devices on the NexBus to latch the address placed on the bus by the master.

−AREQ[n]: The Alternate Bus Request signals are driven by would-be masters on the NexBus to secure bus mastership together with control of the AB. The arbiter examines these signals together with the −NREQ signals (q.v.) and the state of the Alternate Bus Interface to determine which device is to be granted mastership of the NexBus. It also passes AB requests to the ABI to cause it to gain control of the AB. The requesting devices drive these signals active at the rising edge of the BCLK.

AUDIO: This is an audio sum node used to drive audio signals from an adapter to the system audio output, or to transfer audio signals between adapters. This line is electrically compatible with the similar line defined on the Microchannel bus, and in a system having a Microchannel bus as an AB it may be electrically connected to the Microchannel's AUDIO line.

AUDIO GND: This is a separate ground for the audio subsytem. It must never be connected to system GND at any point except the subsystem's audio amplifier (radial grounding).

+/−BCLK: These are the TTL-level bus clock and its inversion which define the NexBus clock period. They are received on each board by a clock chip and are terminated on-board by a 180 ohm resistor connecting +BCLK to −BCLK.

−CACHBL[n], GCACHBL: Cacheable: The −CACHBL[n] signals are driven active by slaves to indicate that portions of their address space may be cacheable. The ABI may drive this signal as non-cacheable to indicate that all the devices on the Alternate Bus are non-cacheable. If a slave does not assert its −CACHBL signal, it cannot support block transfers.

−CHCHK: Channel Check is generated on the adapters on the NexBus upon detection of a systemwide error condition. It is gated by logic in the ABI to cause the −NMI pin of the primary processor on the NexBus to be asserted.

−DCL[n], GDCL: Dirty Cache Lock: The −DCL[n] signals are issued by all the caching devices on the bus. The purpose of this signal is to let the caching devices indicate that the current read or write operation hit in a dirty cache block. During reads, GDCL indicates to the master that data supplied by the slave is stale. During all types of operations, the −DCL lines are used to preemptively gain control of the bus so that the intervenor can supply updated memory to the requestor and to memory by doing a block write.

GATEA20: This signal, which exists only on the Primary Processor slot, slot 0Fh, is driven by the ABI and received by the primary processor. When this signal is active, the processor drives bit 20 of the address line to any desired value. When this bit is inactive bit 20 of the address is set to zero. The purpose of this signal is to replicate the method in which IBM PC's work around an 80286 bug in implementing address wrap around for addresses above the address limit.

−GNT[n]: The Bus Grant signals are driven by the arbiter to the arbitrating devices on the NexBus to indicate that the bus has been granted to the requesting device. These signals are driven active at the rising edge of the BCLK.

−HOLD32[n]: The Hold Bus for 32-Bit Transfer signals are asserted by a 32-bit wide device receiving data (either a master performing a read operation or a slave in a write operation) to tell the arbiter not to immediately re-grant the bus after the fall of GXACK and to cause the swapping logic to latch and transfer the high-order four bytes of data from AD<63:32> onto AD<31:0>.

−INTR[n]: The Interrupt signals are generated by the interrupt controllers on the ABI and dispatched radially to each processor slot (primary or secondary) on the NexBus.

−IRQ<3:7,9:12,14:15>: The Interrupt Request signals are logically combined with the interrupt request lines on the AB, and are used by individual devices on the NexBus to gain the attention of a processor. Certain interrupt levels are pre-defined: −IRQ<0> is a periodic interrupt from the system timers; −IRQ<1> is the interrupt from the Keyboard Controller; −IRQ<2> is an internal cascade signal from one interrupt controller to another and is not available for use; −IRQ<8> is used as a general purpose interrupt from the Real Time Clock. −IRQ<13> is derived from −NPIRQ[n] lines (as described below). Therefore, only levels 3:7,9:12, and 14:15 are available as lines on the NexBus.

−LATCH32[n]: The Latch 32 Bits of Data signals are driven by a 32-bit wide data provider (a master doing a write operation or a slave in a read operation) to cause the swapping logic to latch the contents of AD<31:0> and transfer it to AD<63:32>.

−NMI: The Non-Maskable Interrupt, which exists only on the Primary Processor slot, SlotID 0Fh, is generated by the ABI in response to any of several error conditions, including −CHCHK on the NexBus or Alternate Bus. It drives the −NMI pin of the primary processor on the NexBus.

−NPIRQ[n]: The Numeric Processor Interrupt Request lines, which exist only on the processor slots, slotIDs 0Ch–0Fh, are driven active by a processor to cause a level-13 interrupt request to the interrupt controller that services that processor slot.

−NREQ[n]: The NexBus Request signals are driven by the masters on the NexBus. The arbiter examines them in conjunction with the −AREQ lines and the state of the ABI to arbitrate bus mastership at the end of each bus sequence. At any time one or more of these signals may be active, requesting the bus, but only one can be granted the NexBus. The bus request signals normally remain active until the corresponding grant line goes active. The requesting devices drive these signals active at the rising edge of the BCLK.

−RESET: The Reset signal is driven by the bus backplane and received by all the devices on the bus. The purpose of this signal is to reset all the adapters on the NexBus. It is redundant, since the same information is contained on the SR signal.

—RESETCPU: The Reset CPU signal, which exists only on the Primary Processor slot, slotID 0Fh, is generated by the ABI and received by the primary processor. The purpose of the this signal is to reset one designated processor.

—SHARE[n], GSHARE: Shared Data: The —SHARE[n] signals are issued by all the caching devices on the bus. The purpose of this signal is to let the caching devices indicate that the current read operation hit in a cache block that is present in another device's cache. During reads, GSHARE indicates to the master that data being read must be cached as SHARED (if cached at all), unless the master has asserted —OWN (transmitted on AD<49> during the address/status phase of a bus operation). The state of GSHARE must be ignored during any operations with —OWN asserted.

SR: The Sync/Reset signal, which originates in the master Clock Distribution (CDIS) chip, is distributed radially on the backplane. It conveys a serial code which includes timing information to synchronize all CDIS chips on all adapters. It also conveys the System RESET signal and bus operating frequency information.

SLOTID<3:0>: Slot ID bits 3 through 0 are encoded on the connector to geographically distinguish one slot from another. This will allow the NexBus to have a maximum of sixteen slots.

TAL: The Try Again Later signal indicates to the master that the current operation cannot be completed at this time because the AB is not available. The TAL signal is transmitted by the ABI, and monitored by all master devices on the NexBus. Upon detecting an active TAL, the master will abort the current operation and will re-try it later. In order to secure the bus for re-trying the operation, the master must assert its —AREQ, thereby assuring that the AB will be available when it is re-granted the bus.

—XACK[n], GXACK: Transfer Acknowledge: The —XACK[n] signals are driven by the slave after it has decoded the address and determined that it is a party in the current operation. The ABI monitors GXACK to determine whether a NexBus device responds to an address within three clocks, to decide whether it needs to perform a crossing operation. During a read operation the master monitors GXACK and GXHLD to determine when data is available on the bus. During a write operation the master again monitors these signals to determine when data is accepted by the slave.

—XHLD[n], GXHLD: Transfer Hold: The —XHLD[n] signals may be driven by the master, the slave, or by a third party monitoring an operation, in order to insert wait states into an operation. Both master and slave must monitor GXHLD to synchronize data transfer.

APPENDIX 2

Address and Status Information

AD<1:0>: Reserved: Current bus masters must drive these bits high (inactive).

AD<2>: ADRS<2> is used as the least-significant 4-byte Word address for I/O operations. It is not used for memory-reference operations and may be driven to either defined state (either 0 or 1).

AD<31:3>: ADRS<31:3> specify a DWord within the 4-Gbyte memory address space for memory references. ADRS<15:3> specifies a DWord address within the 64-Kbyte I/O address space for I/O operations, and AD<31:16> must be 0.

AD<39:32>: —BE<7:0> Byte-Enable bits 7 through 0 are framing bits associated with the data of the current bus operation. In I/O operations, —BE<7:4> are not used and must be driven high (inactive), while —BE<3:0> specify the byte(s) to be transferred on AD<31:0>. In a memory operation, all eight bits are used to specify the byte(s) to be transferred on AD<63:0>. In a multi-DWord block transfer operation the BE's have meaning only for the first DWord of the transfer, and only for write operations; the rest of the DWords have implicit byte enable bits of all 0's, i.e., all bytes are to be transferred in each of the other DWords. Even if a master is requesting a block read operation, it should use the BE's to specify the bytes that it needs immediately, since a non-cacheable slave may force a single-DWord transfer operation and then needs only to return to the master only those bytes for which BE's are asserted.

AD<45:40>: MID<5:0>: Master ID bits 5 are driven by the masters indicating their ID number. It indicates to the slave, and to the ABI during crossing operations, which master is currently doing operations on the bus. The most significant four bits of the MID field are the same as the SLOTID bits. The least significant 2 bits are dependent upon the devices in the designated slot. So, a given slot may accommodate up to four devices.

AD<48:46>: OP_TYPE<2:0> are driven by the master to define the type of operation to be performed. Note that AD<48:46> have the same meaning that these signals have in the 80386 microprocessor.

| AD<48><br>M/—IO | AD<47><br>D/—C | AD<46><br>W/—R | BUS<br>OPERATION TYPE |
|---|---|---|---|
| 0 | 0 | 0 | INTERRUPT ACK |
| 0 | 0 | 1 | HALT, SHUTDOWN |
| 0 | 1 | 0 | I/O DATA READ |
| 0 | 1 | 1 | I/O DATA WRITE |
| 1 | 0 | 0 | MEM CODE READ |
| 1 | 0 | 1 | HALT, SHUTDOWN |
| 1 | 1 | 0 | MEM DATA READ |
| 1 | 1 | 1 | MEM DATA WRITE |

AD<49>: —OWN may be driven active during read or write operations. This signal is driven by the master during such operations requesting the ownership of data in its cache. If this operation hits in the cache of another caching master, then that master must change the status of its cache line to the ABSENT, rather than SHARED, state.

AD<51:50>: —BLOCK4, —BLOCK2: For memory references, these two bits define the size of data requested to be transferred in the operation, as shown in Table 2, below. For single-DWord operations and block writes, the bytes to be transferred in the first DWord, hence, the size of the transfer, can be specified by the Byte Enable bits described above. Note that if the slave is incapable of transferring more than a single DWord it may deny a request for a larger block by negating its XACK signal after a single DWord, or the bytes thereof specified by the Byte Enable bits, have been transferred. These bits should be "1" for I/O operations.

| −BLOCK4 AD<51> | −BLOCK2 AD<50> | BLOCK SIZE |
|---|---|---|
| 1 | 1 | Single DWord (0 to 8 bytes) |
| 1 | 0 | 2-DWord Block (8 to 16 bytes) |
| 0 | 1 | 4-DWord Block (24 to 32 bytes) |
| 0 | 0 | not used: Specified as "don't care" |

AD<52>: −ECHO is asserted to cause the ABI to echo the operation onto the Alternate Bus, even if the operation does not require a crossing transfer. It will normally be asserted only for write operations on data shared between a NexBus master and a caching master on the AB. (If all operations were performed with −ECHO asserted the NexBus would be forced to perform at the speed of the AB.) −ECHO may be asserted for a read, but it must not be asserted for a Block operation.

AD<63:53>: Reserved: Current bus masters must drive these bits high (inactive).

APPENDIX 3

Interrupt Assignments

| Request | Meaning | Notes |
|---|---|---|
| −IRQ<0> | Periodic Timer Interrupt | per-CPU timers |
| −IRQ<1> | Keyboard Interface Ctrl. | |
| −IRQ<2> | Not Used | Cascade from −IRQ<15:8> |
| −IRQ<3> | Serial Port 2 | Depends on System Conf. |
| −IRQ<4> | Serial Port 1 | Depends on System Conf. |
| −IRQ<5> | Parallel Port 2 | Depends on System Conf. |
| −IRQ<6> | Diskette Controller | |
| −IRQ<7> | Parallel Port 1 | Depends on System Conf. |
| −IRQ<8> | Real-Time Clock | per-CPU clock |
| −IRQ<9> | Unassigned | |
| −IRQ<10> | Unassigned | |
| −IRQ<11> | ATTN (Primary, AIS=0) | common −IRQ<11> line |
| −IRQ<12> | Mouse Interface Ctrl. | |
| −IRQ<13> | Numeric Proc./ Alt. ATTN | per-CPU |
| −IRQ<14> | Fixed Disk Controller | |
| −IRQ<15> | Unassigned | |

APPENDIX 4

Pal Equations for Symmetric MPIC

```
                U1 - Address Decode (Symmetric)
Inputs:  XA0           Outputs:  SELECT
         XA1
         XA2
         XA3
         XA4
         XA5
         XA6
         XA7
         XA8
         XA9
Equations
    SELECT = 1
Symbol Meanings:
    & signifies logical AND.
    # signifies logical OR.
                U2 - Interrupt Control (Symmetric)
Inputs:  MID2          Outputs:  −INTA0
         MID3                    −INTA1
         MID4                    −INTA2
         MID5                    −INTA3
         −INTA                   −OBIOP0
         −OBIOP                  −OBIOP1
         SETUP_SEL0              −OBIOP2
         SETUP_SEL1              −OBIOP3
         HLDA386
         SELECT
Declarations
    SETUP = SETUP_SEL<1:0>
    ID = MID<5:2>
    OPER_MODE  = (SETUP .EQ. 0)
    SETUP_PIC1 = (SETUP .EQ. 1)
    SETUP_PIC2 = (SETUP .EQ. 2)
    SETUP_PIC3 = (SETUP .EQ. 3)
    CPU0 = (ID .EQ. 15)
    CPU1 = (ID .EQ. 14)
    CPU2 = (ID .EQ. 13)
    CPU3 = (ID .EQ. 12)
Equations
    INTA0  = CPU0 & INTA
    INTA1  = CPU1 & INTA
    INTA2  = CPU2 & INTA
    INTA3  = CPU3 & INTA
    OBIOP0 = OBIOP & CPU0 & OPER_MODE #
```

|  |  |  |
|---|---|---|
| | | -continued |
| | | OB1OP & HLDA386 |
| | OB1OP1 = | OB1OP & CPU0 & SETUP_PIC1 # |
| | | OB1OP & CPU1 & OPER_MODE & SELECT |
| | OB1OP2 = | OB1OP & CPU0 & SETUP_PIC2 # |
| | | OB1OP & CPU2 & OPER_MODE & SELECT |
| | OB1OP3 = | OB1OP & CPU0 & SETUP_PIC3 # |
| | | OB1OP & CPU3 & OPER_MODE & SELECT |
| | | U3 - Attention Control (Symmetric) |
| Inputs: | IRQSEL0 | Outputs: ATTN0 |
| | IRQSEL1 | ATTN1 |
| | W_R | ATTN2 |
| | ATTN_STB | ATTN3 |
| | RESET4 | INTSENSE |
| Declarations | | |
| | IRQ_SEL = IRQSEL <0:1> | |
| | ATTN_SET = (ATTN_STB & -W_R) | |
| | ATTN_CLR = (ATTN_STB & W_R) | |
| | SET0 = ( (IRQ_SEL .EQ. 0) & ATTN_SET ) | |
| | SET1 = ( (IRQ_SEL .EQ. 1) & ATTN_SET ) | |
| | SET2 = ( (IRQ_SEL .EQ. 2) & ATTN_SET ) | |
| | SET3 = ( (IRQ_SEL .EQ. 3) & ATTN_SET ) | |
| | RESET0 = ( (IRQ_SEL .EQ. 0) & ATTN_CLR ) # RESET4 | |
| | RESET1 = ( (IRQ_SEL .EQ. 1) & ATTN_CLR ) # RESET4 | |
| | RESET2 = ( (IRQ_SEL .EQ. 2) & ATTN_CLR ) # RESET4 | |
| | RESET3 = ( (IRQ_SEL .EQ. 3) & ATTN_CLR ) # RESET4 | |
| Equations | | |
| | INTSENSE = 0 | |
| | WHEN ( RESET0 ) THEN ATTN0 = 0 | |
| | WHEN ( RESET1 ) THEN ATTN1 = 0 | |
| | WHEN ( RESET2 ) THEN ATTN2 = 0 | |
| | WHEN ( RESET3 ) THEN ATTN3 = 0 | |
| | WHEN ( -RESET0 & SET0 ) THEN ATTN0 = 1 | |
| | WHEN ( -RESET1 & SET1 ) THEN ATTN1 = 1 | |
| | WHEN ( -RESET2 & SET2 ) THEN ATTN2 = 1 | |
| | WHEN ( -RESET3 & SET3 ) THEN ATTN3 = 1 | |
| | WHEN ( -RESET0 & -SET0 ) THEN ATTN0 = ATTN0 | |
| | WHEN ( -RESET1 & -SET1 ) THEN ATTN1 = ATTN1 | |
| | WHEN ( -RESET2 & -SET2 ) THEN ATTN2 = ATTN2 | |
| | WHEN ( -RESET3 & -SET3 ) THEN ATTN3 = ATTN3 | |
| | (RESET overrides SET) | |
| | | U4 - Interrupt Generation (Symmetric) |
| Inputs: | INTR_13_11 | Outputs: -IRQ11OUT |
| | ATTN0 | -IRQ11_1 |
| | ATTN1 | -IRQ11_2 |
| | ATTN2 | -IRQ11_3 |
| | ATTN3 | IRQ13OUT |
| | -NPIRQ1 | -IRQ13_1 |
| | -NPIRQ2 | -IRQ13_2 |
| | -NPIRQ3 | -IRQ13_3 |
| | -IRQ11IN | |
| Equations | | |
| | IRQ11OUT = (ATTN0 & -INTR_13_11) # IRQ11IN | |
| | IRQ11_1 = (ATTN1 & -INTR_13_11) # IRQ11IN | |
| | IRQ11_2 = (ATTN2 & -INTR_13_11) # IRQ11IN | |
| | IRQ11_3 = (ATTN3 & -INTR_13_11) # IRQ11IN | |
| | IRQ13OUT = 0 | |
| | ENABLE IRQ13OUT = (ATTN0 & INTR_13_11) | |
| | IRQ13_1 = (ATTN1 & INTR_13_11) # NPIRQ1 | |
| | IRQ13_2 = (ATTN2 & INTR_13_11) # NPIRQ2 | |
| | IRQ13_3 = (ATTN3 & INTR_13_11) # NPIRQ3 |

APPENDIX 5

Pal Equations for Asymmetric MPIC

|  |  |  |
|---|---|---|
| | | U1 - Attention Control (Asymmetric) |
| Inputs: | IRQSEL0 | Outputs: ATTN0 |
| | IRQSEL1 | ATTN1 |
| | W_R | ATTN2 |
| | ATTN_STB | ATTN3 |
| | RESET4 | -IRQ11OUT |
| | INTR13/11 | -IRQ13OUT |
| | RESET4 | |
| Declarations | | |
| | IRQ_SEL = IRQSEL <0:1> | |
| | ATTN_SET = (ATTN_STB & -W_R) | |
| | ATTN_CLR = (ATTN_STB & W_R) | |
| | SET0 = ( (IRQ_SEL .EQ. 0) & ATTN_SET ) | |
| | SET1 = ( (IRQ_SEL .EQ. 1) & ATTN_SET ) | |

-continued

```
        SET2    = ( (IRQ_SEL .EQ. 2) & ATTN_SET )
        SET3    = ( (IRQ_SEL .EQ. 3) & ATTN_SET )
        RESET0  = ( (IRQ_SEL .EQ. 0) & ATTN_CLR ) # RESET4
        RESET1  = ( (IRQ_SEL .EQ. 1) & ATTN_CLR ) # RESET4
        RESET2  = ( (IRQ_SEL .EQ. 2) & ATTN_CLR ) # RESET4
        RESET3  = ( (IRQ_SEL .EQ. 3) & ATTN_CLR ) # RESET4
Equations
        WHEN ( RESET0 ) THEN ATTN0 = 0
        WHEN ( RESET1 ) THEN ATTN1 = 0
        WHEN ( RESET2 ) THEN ATTN2 = 0
        WHEN ( RESET3 ) THEN ATTN3 = 0
        WHEN ( -RESET0 & SET0 ) THEN ATTN0 = 1
        WHEN ( -RESET1 & SET1 ) THEN ATTN1 = 1
        WHEN ( -RESET2 & SET2 ) THEN ATTN2 = 1
        WHEN ( -RESET3 & SET3 ) THEN ATTN3 = 1
        WHEN ( -RESET0 & -SET0 ) THEN ATTN0 = ATTN0
        WHEN ( -RESET1 & -SET1 ) THEN ATTN1 = ATTN1
        WHEN ( -RESET2 & -SET2 ) THEN ATTN2 = ATTN2
        WHEN ( -RESET3 & -SET3 ) THEN ATTN3 = ATTN3
        IRQ11OUT = 0
        ENABLE IRQ13OUT = (ATTN0 & -INTR_13_11)
        IRQ13OUT = 0
        ENABLE IRQ13OUT = (ATTN0 & INTR_13_11)
Symbol Meanings:
        & signifies logical AND.
        # signifies logical OR.
                U2 - Interrupt Generation (Asymmetric)
Inputs: ATTN1           Outputs:  -INTR1
        ATTN2                     -INTR2
        ATTN3                     -INTR3
        -NPIRQ1
        -NPIRQ2
        -NPIRQ3
Equations
        INTR1  =  ATTN1 # NPIRQ1
        INTR2  =  ATTN2 # NPIRQ2
        INTR3  =  ATTN3 # NPIRQ3
                U3 - Interrupt Control (Asymmetric)
Inputs: MID2            Outputs:  -INTA0
        MID3                      -INTA1
        MID4                      -OBIOP0
        -INTA                     -INTSENSE
        -OBIOP
Declarations
        SETUP = SETUP_SEL<1:01>
        ID = MID<5:2>
        OPER_MODE   = (SETUP .EQ. 0)
        SETUP_PIC1  = (SETUP .EQ. 1)
        SETUP_PIC2  = (SETUP .EQ. 2)
        SETUP_PIC3  = (SETUP .EQ. 3)
        CPU0  =  (ID .EQ. 15)
        CPU1  =  (ID .EQ. 14)
        CPU2  =  (ID .EQ. 13)
        CPU3  =  (ID .EQ. 12)
Equations
        INTA0     =   CPU0 & INTA
        INTA1     =  -CPU0 & INTA
        OBIOP0    =   OBIOP
        INTSENSE  =  0
                U4 - Interrupt Vector (Asymmetric)
Inputs: INTA1           Outputs:  XD<7:0>
Declaration
        XD = XD<7:0>
Equations
        XD = 80 (hex)
        ENABLE XD = INTA1
```

What is claimed is:

1. A multiprocessing computer system comprising:
   a data bus;
   an address bus;
   a primary processor and at least one secondary processor coupled to said data bus and said address bus, each processor having an interrupt input;
   a set of interrupt request (IRQ) lines;
   a plurality of devices, each coupled to at least one of said IRQ lines and capable of asserting an interrupt request on at least one IRQ line to which it is coupled;
   a programmable interrupt controller (PIC), coupled to at least one of said IRQ lines and to at least a portion of said data bus, said PIC being responsive to at least some interrupt requests received from at least one of said devices, and having means for communicating a given received interrupt request to the interrupt input of said primary processor;
   MPIC means, including said PIC, and further including means coupled to at least one of said IRQ lines and to at least a portion of said data bus, being responsive to at least some interrupt requests received from at least one of said devices, for communicating a given received interrupt request to the interrupt input of a selected secondary processor;

means, included with each given processor, for carrying out an interrupt acknowledge operation in response to a received interrupt request, including (a) means for placing on said address bus an address that is specific to interrupt acknowledge operations but independent of any particular processor, and (b) means for communicating to said MPIC means an identifier that is specific to that given processor; and means, included with said MPIC means and responsive to said identifier, (a) for causing said PIC to provide an interrupt vector on said data bus if said identifier specifies said primary processor, and (b) for providing an interrupt vector on said data bus if said identifier specifies a secondary processor.

2. The computer system of claim 1, and further comprising:

an attention flag defined to correspond to a particular one of said processors;

means for setting said attention flag in response to a set of conditions that requires that said address bus have placed thereon at least one particular address defined to correspond to the particular one of said processors; and means for communicating the fact of setting of said attention flag to said MPIC means.

3. The computer system of claim 2 wherein said set of conditions also requires that said particular address be placed on said address bus in connection with a read operation.

4. The computer system of claim 3, and further comprising means for clearing said attention flag in response to a set of conditions that requires that said address bus have placed thereon at least one particular address defined to correspond to the particular one of said processors in connection with a write operation.

5. The computer system of claim 1 wherein said MPIC comprises a number of secondary PICs equal to the number of secondary processors to define at least a portion of said means for providing an interrupt vector on said data bus if said identifier specifies a secondary processor.

6. The computer system of claim 1, further comprising a set of Master ID (MID) lines coupled to said processors, and wherein said means for communicating to said MPIC means an identifier that is specific to that given processor comprises means for placing said identifier on said MID lines in connection with an interrupt acknowledge operation.

7. The computer system of claim 1 wherein said PIC has a plurality of interrupt request inputs, and wherein said MPIC means includes means, responsive to a configuration flag capable of assuming either of two states, for directing at least one type of interrupt request to one or the other of two specific interrupt request inputs, depending on the state of said configuration flag.

8. The computer system of claim 1 wherein said means for providing an interrupt vector on said data bus if said identifier specifies a secondary processor provides the same vector in response to at least two types of interrupt.

9. The computer system of claim 1 wherein said address and data buses comprise a set of time-multiplexed lines.

10. A multiprocessing computer system comprising:
a data bus;
an address bus;
a set of interrupt (IRQ) lines;
a plurality of processors coupled to said data bus and said address bus, each processor having an interrupt input;
at least one device coupled to at least one of said IRQ lines and capable of asserting an interrupt request on one of said interrupt request lines;
a plurality of programmable interrupt controllers (PICs), equal in number to the number of processors in said plurality of processors, each given PIC being defined to correspond to a respective one of said processors and having (a) a set of interrupt inputs coupled to at least one of said interrupt request lines, (b) an interrupt output coupled to the interrupt input of the respective one of said processors to which the given PIC is defined to correspond, and (c) a data port coupled to at least a portion of said data bus;
means included with each given processor, for carrying out an interrupt acknowledge operation with the PIC that is defined to correspond to that given processor, including means for placing on said address bus a PIC address that is specific to PICs but independent of any particular PIC, and means for generating an identifier that is specific to that given processor;
logic means, coupled to said means for carrying out an interrupt acknowledge operation and responsive to the occurrence of an interrupt acknowledge operation and to said identifier, (a) for selecting which PIC is to participate in the interrupt acknowledge operation, and (b) for applying control signals to the PIC so selected; and
means included with each given PIC, responsive to control signals from said logic means, for providing an interrupt vector on said data bus.

11. The computer system of claim 10, further comprising:
an attention flag defined to correspond to a particular one of said processors;
means for setting said attention flag in response to a set of conditions that requires that said address bus have placed thereon at least one particular address defined to correspond to the particular one of said processors; and
means for communicating the fact of setting of said flag to said logic means.

12. The computer system of claim 11 wherein said set of conditions also requires that said particular address be placed on said address bus in connection with a read operation.

13. The computer system of claim 12, and further comprising means for clearing said attention flag in response to a set of conditions that requires that said address bus have placed thereon at least one particular address defined to correspond to the particular one of said processors in connection with a write operation.

14. The computer system of claim 10 wherein each PIC has a plurality of interrupt request inputs, and wherein said logic means includes means, responsive to a configuration flag capable of assuming either of two states, for directing at least one type of interrupt request to one or the other of two specific interrupt request inputs, depending on the state of said configuration flag.

15. The computer system of claim 10 wherein said address and data buses comprise a set of time-multiplexed lines.

16. The computer system of claim 10, further comprising a set of Master ID (MID) lines coupled to said processors, and wherein:
said means for generating any identifier that is specific to that given processor operates to place said identifier on said MID lines; and
said logic means is coupled to said MID lines.

* * * * *